(12) United States Patent
Garrido et al.

(10) Patent No.: US 6,290,199 B1
(45) Date of Patent: Sep. 18, 2001

(54) DRIVE MECHANISM FOR A SEAT ADJUSTER

(75) Inventors: Pascal Garrido, Gravehurst; Hugh D. Downey, Barrie, both of (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/371,143

(22) Filed: Aug. 9, 1999

(51) Int. Cl.$^7$ ............................ F16M 13/00; F16H 27/02
(52) U.S. Cl. ........................ 248/424; 74/89.15; 248/429
(58) Field of Search .................... 248/424, 429, 248/419, 420; 74/89.15, 89.14

(56) References Cited

U.S. PATENT DOCUMENTS

| | | | | |
|---|---|---|---|---|
| 4,802,374 | * | 2/1989 | Hamelin et al. .................... | 74/89.14 |
| 5,172,601 | * | 12/1992 | Siegrist et al. ..................... | 74/89.15 |
| 5,292,164 | * | 3/1994 | Rees .................................... | 396/65.1 |
| 5,456,439 | * | 10/1995 | Gauger ................................ | 248/429 |
| 5,762,309 | * | 6/1998 | Zhou et al. ......................... | 248/429 |
| 5,769,377 | * | 6/1998 | Gauger ................................ | 249/429 |
| 5,797,293 | * | 8/1998 | Chaban ............................... | 74/89.15 |
| 5,873,558 | * | 2/1999 | Sakamoto ........................... | 248/429 |
| 5,941,494 | * | 8/1999 | Garrido ............................... | 248/429 |

* cited by examiner

*Primary Examiner*—Anita King
(74) *Attorney, Agent, or Firm*—Banner & Witcoff

(57) ABSTRACT

A drive assembly for a seat adjuster is used to adjust the longitudinal position of a vehicle seat between a plurality of positions. The drive assembly includes a first track mounted to a vehicle structure a second track that is supported for longitudinal movement relative to the first track. A bracket is fixed relative to the first track and has an opening through which a drive nut is inserted. The drive nut has a threaded central bore and is rotatable between a first position and a second position. In the first position the drive nut moves relative to the bracket through the opening. In the second position the drive nut contacts the bracket to form a positive structural engagement between the drive nut and the bracket. A screw shaft has an elongated body with an external threaded surface that engages the threaded central bore in the drive nut to move the second track between a plurality of adjusted positions relative to the first track. A drive motor is used to drive the screw shaft relative to the drive nut only when the drive nut is moved from the first position to the second position.

19 Claims, 5 Drawing Sheets

DRIVE MECHANISM FOR A SEAT ADJUSTER

BACKGROUND OF THE INVENTION

This invention relates to an adjustment mechanism with a unique drive assembly configuration for adjusting the position of a vehicle seat. Specifically, the drive assembly includes a drive nut that is rotated with respect to a bracket during assembly to form a positive structural engagement between the bracket and the drive nut.

Seat adjusters are often used in seat assemblies for selectively adjusting the position of a vehicle seat. Typically a first track member is fixed to a vehicle structure, such as a floor, and a second track member is supported with respect to the first track member for movement relative to the first track member such that the seat position can be adjusted horizontally in forward or rearward directions with respect to the vehicle. The adjustment of the seat assembly is performed by either a mechanical actuator, an electrical actuator, or an electromechanical actuator.

Typically, non-mechanical horizontal seat adjustment is accomplished by using an electric motor and a driving mechanism. The driving mechanism is usually either a gear assembly or a spindle and nut assembly. As the gear or spindle and nut assemblies are driven by the motor, the second track moves relative to the first track until the seat is in the desired position.

These known driving mechanisms are complex and have a significant number of components that require a great deal of packaging space. The significant number of components also makes assembly of the seat adjuster difficult and time consuming because each of the components has to be installed into the adjuster with fasteners and other mounting hardware. This also significantly increases the cost of the seat adjuster.

Thus, it is desirable to have a seat adjuster with a drive assembly that is easy to assemble and reduces the overall number of required components. It is also desirable to have a seat adjuster with a drive assembly that provides sufficient strength with fewer components, fasteners and mounting hardware so that assembly cost and overall assembly weight is reduced, and available packaging space for other vehicle components is increased.

SUMMARY OF THE INVENTION

In a disclosed embodiment, a drive assembly for a seat adjuster includes a first track that is mounted to a vehicle structure to define a longitudinal axis, and a second track that is supported for movement relative to the first track along the longitudinal axis. A bracket is fixed relative to the first track and has at least one opening through which a drive nut is inserted. The drive nut is movable between a first position where the drive nut moves relative to the bracket through the opening and a second position where the drive nut remains fixed relative to the bracket. A shaft engages the drive nut to move the second track relative to the first member. A drive motor is used to drive the shaft relative to the drive nut only when the engagement member is moved from the first position to the second position.

In one embodiment, an external face of the drive nut comes into contact with a portion of the bracket adjacent to the opening to form a positive structural engagement between the drive nut and the bracket. In order to accomplish this, the opening is defined by a first vertical height and a first horizontal width and the drive nut is defined by a second vertical height and a second horizontal width. The first and second vertical heights are aligned and parallel with each other when the drive nut is in the first position and are in a non-parallel relationship to each other when the drive nut is in the second position.

A method for assembling the drive apparatus for a seat adjuster includes the steps of providing a first track mounted to a vehicle structure to define a longitudinal axis and a second track supported for movement relative to the first track along the longitudinal axis. Further steps include fixing a bracket having at least one opening relative to the first track, inserting a drive nut through the opening in the bracket, rotating the drive nut with respect to the bracket so that the drive nut cannot be removed through the opening, and connecting the drive nut to a driving mechanism.

The subject invention provides a simplified drive assembly configuration for a seat adjuster that is durable, easily assembled, easily maintained, and is inexpensive. These and other features can be understood from the following specification and drawings.

DETAILED DESCRIPTION OF THE PREFERRED EMBODIMENT

Figure 1:
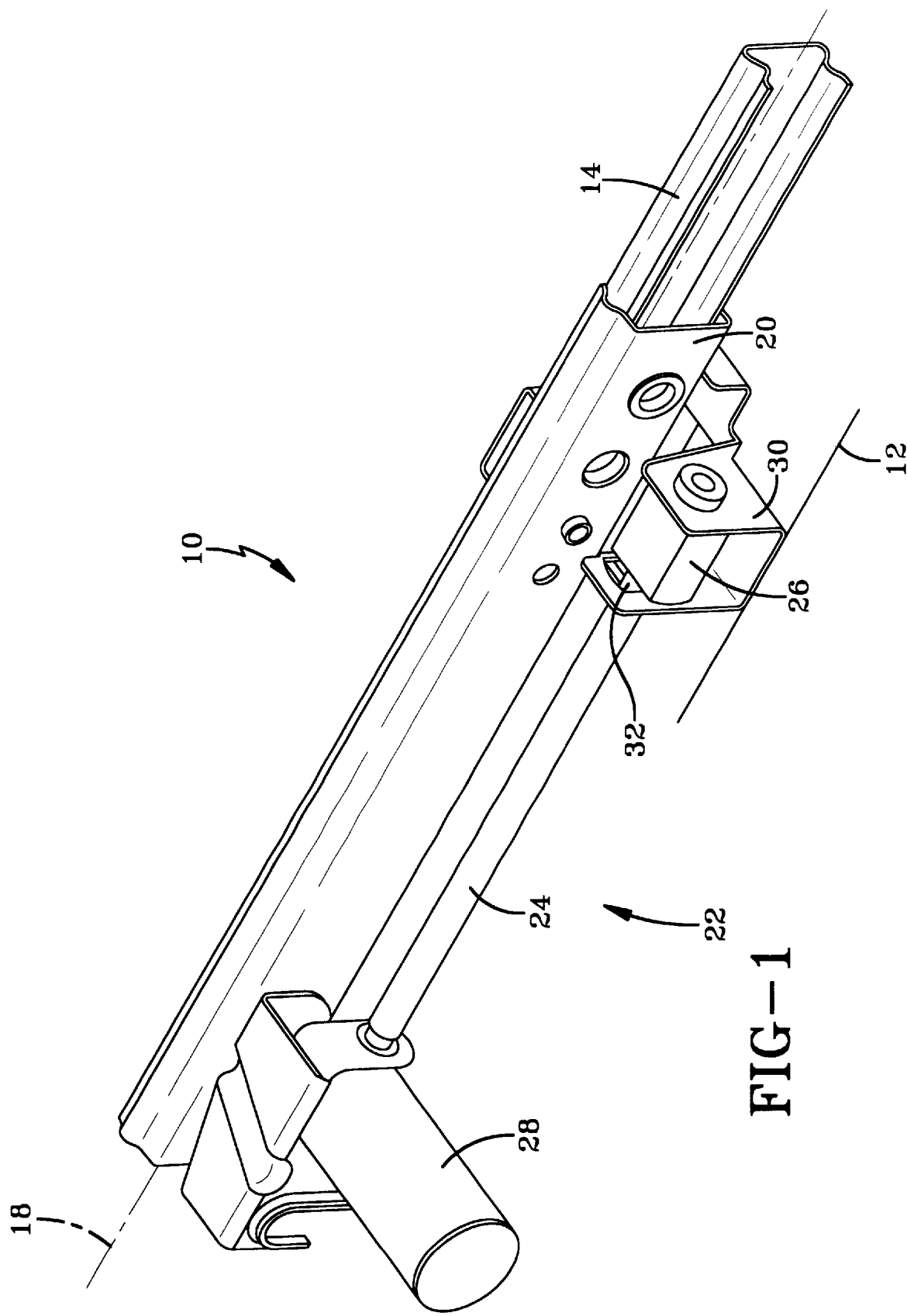
FIG. 1 is a perspective view of a seat adjuster, partially cut-away, incorporating the inventive drive assembly.

A partial seat adjuster and track assembly is shown generally at 10 in FIG. 1. The seat adjuster and track assembly 10 are mounted to a vehicle structure 12, such as a floor or structural frame member, for example. Seat adjusters are used to move track assemblies to selectively adjust the position of a vehicle seat within the vehicle. A first track member 14 is fixed to the vehicle structure 12 and defines a longitudinal axis 18. A second track member 20 is supported on the first track member 14 for movement relative to the first track member 14 such that the seat position can be adjusted horizontally in forward or rearward directions with respect to the vehicle.

The vehicle seat preferably includes track assemblies on an inboard side and an outboard side of the seat. The terms inboard and outboard are used in this description for clarity and illustration purposes only and cannot be considered limiting. FIG. 1, only shows the track assembly on inboard side of the vehicle. It should be understood that the outboard side includes a similar track assembly.

Both the inboard and outboard sides of the seat adjuster and track assembly 10 include the first track member 14 and the second track member 20. The first track 14 is preferably fixedly mounted to the vehicle structure 12. The second track 20 is an upper track and is slidably supported on the lower track so that the upper track can be moved in a forward or rearward direction relative to the lower track. The terms forward, rearward, upper, and lower, as used in this description, are for illustration purposes only and cannot be considered limiting. The profiles of the first and second tracks 14, 20 ensure that the second track 20 only moves along the longitudinal axis 18 to adjust the horizontal position of the seat.

The seat adjuster and track assembly 10 includes a driving apparatus, shown generally at 22, that is used to move the second track 20 relative to the first track 14. The driving apparatus 22 includes a shaft 24, a drive nut or other similar engagement member 26 known in the art, and an electric drive motor 28. A bracket 30 is fixed relative to the first track 14 and has at least one opening 32. There may be one or more shaft/drive nut assemblies per seat assembly. During assembly of the driving apparatus 22, the drive nut 26 is rotated from an installation position where the nut 26 is inserted through the opening 32 in the bracket 30 to an assembled position. In the assembled position, the nut 26 is positioned such that the nut 26 cannot be removed from the bracket 30 through the opening 32.

The bracket 30 has a mounting portion 16 that extends underneath the tracks 14, 20. The mounting portion 16 is preferably attached to the first track 14 to fix the bracket 30 relative to the second track 20. The mounting portion 16 can be attached to the first track 14 by any of various known attachment methods such as bolts, rivets, screws, and welding, for example. Optionally, the mounting portion 16 of the bracket 30 can be fixed to the vehicle floor 12 or other structural mounting member.

The shaft 24 is supported for movement with the second track 20. The shaft 24 is driven by the motor 28 and engages the drive nut 26 to move the second track 20 relative to the first track 14. The drive motor 28 drives the shaft 24 relative to the drive nut 26 only after the nut 26 has been moved to the assembled position. In the assembled position, the nut 26 remains positionally fixed relative to the bracket 30. As the drive nut 26 is rotated from the installation position to the assembled position, an external face 34 of the drive nut 26 comes into contact with a portion 36 of the bracket 30 adjacent to the opening 32 to form a positive structural engagement between the nut 26 and the bracket 30. This allows the shaft 24 to be driven by the motor 28 through the nut 26. The second track 20 moves with the shaft 24 and thus, the horizontal seat position is adjusted. A single drive motor 28 can be used to drive shafts 24 on both inboard and outboard track assemblies, or a separate motor 28 could be used for each track assembly.

Figure 3:
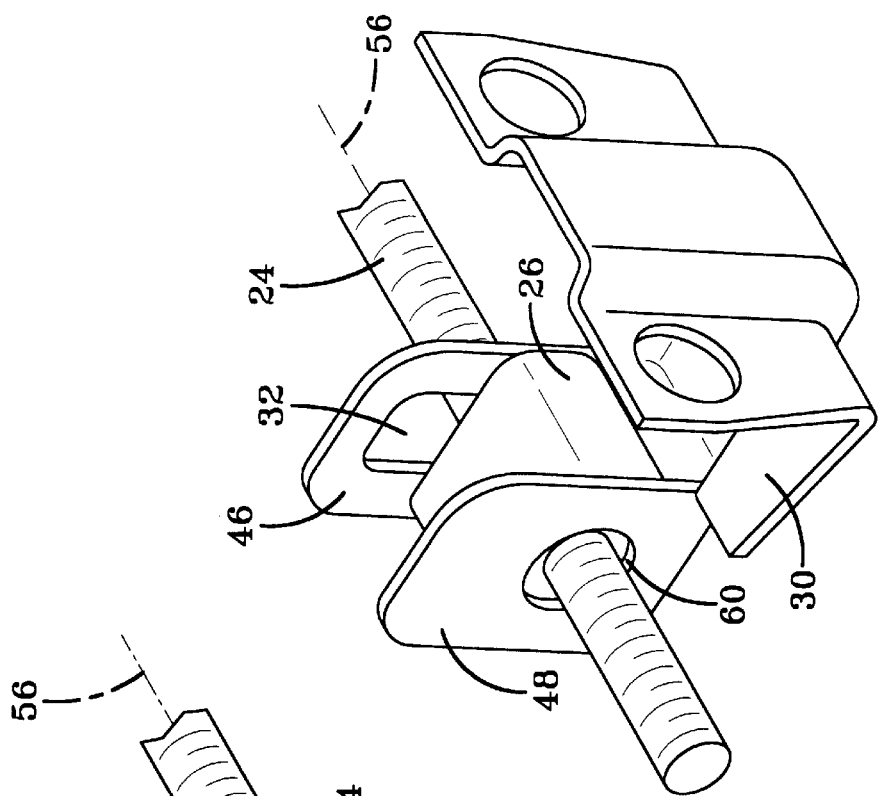
FIG. 3 is a perspective view, partially cut-away, showing the embodiment of FIG. 2 in an assembled position.
Figure 2:
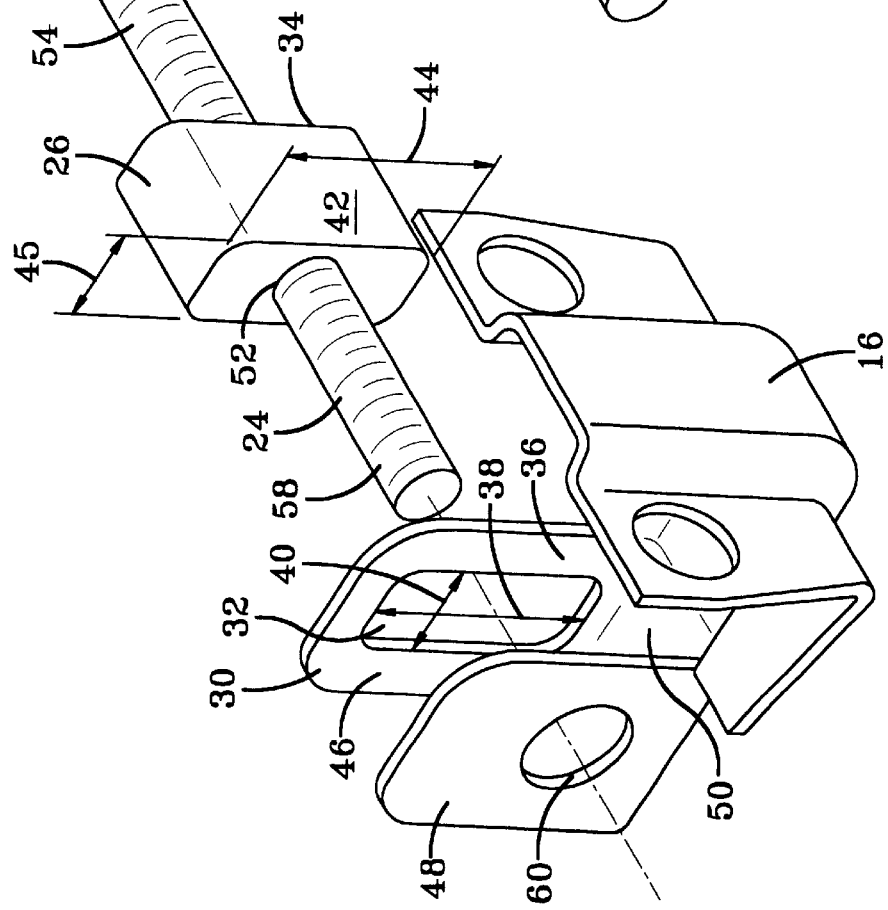
FIG. 2 is an exploded view of the preferred embodiment of the invention as shown in FIG. 1.

As shown in FIG. 2, the opening 32 in the bracket 30 is defined by a first vertical height 38 and a first horizontal width 40. The drive nut 26 includes a main body portion 42 that is defined by a second vertical height 44 and a second horizontal width 45. The first 38 and second 44 vertical heights are parallel and aligned with each other when the body portion 42 is in the installation position, shown in FIG. 2. The first 38 and second 44 vertical heights are in a non-parallel relationship to each other when the body portion 42 is rotated with respect to the bracket 30 to the assembled position as shown in FIG. 3.

The bracket 30 is preferably mounted to the first track 14 and includes first 46 and second 48 upwardly extending legs that are spaced apart from each other and interconnected by a base 50. The drive nut 26 is located between the first 46 and second 48 legs, and positioned above the base 50 when the nut 26 is in the assembled position.

The body portion 42 of drive nut 26 is preferably rectangular in shape and has a central threaded bore 52 extending through the body 42. The shaft 24 is preferably comprised of an elongated cylindrical body 54 that defines an axis of rotation 56 and has an external threaded surface 58 that engages the threaded bore 52.

The opening 32 in the bracket 30 preferably of corresponding shape to the body portion 42 of the drive nut 26. Thus in the preferred embodiment, the opening 32 is rectangular in shape such that the rectangular shaped body 42 of the drive nut 26 is aligned with the rectangular opening 32 in the bracket 30 when the drive nut 26 is in the installation position. The rectangular shaped body 42 is then rotated with respect to the bracket 30 about the axis of rotation 56 to move the drive nut 26 from the installation position to the assembled position. Preferably, the drive nut 26 is rotated ninety degrees about the axis of rotation 56. A snap in feature may be provided to prevent the drive nut 26 from returning to the installation position during operation. After rotation to the assembled position, as seen in FIG. 3, the drive nut 26 cannot be removed from the bracket 30 through the opening 32 because the second vertical height 44 is greater than the first horizontal width 40. While a ninety degree rotation is preferred, the drive nut 26 can be rotated about the axis 56 to positions greater or less than ninety degrees.

The opening 32 through which the drive nut 26 is inserted is preferably located in the first leg 46 of the bracket 30. The second leg 48 also includes an opening 60. The opening 60 is preferably circular but can be of any shape. However, the opening 60 must be large enough such that the shaft 24 can extend through both openings 32, 60 in the bracket 30 when the drive nut 26 is in either the installation or assembled positions.

Figure 4:
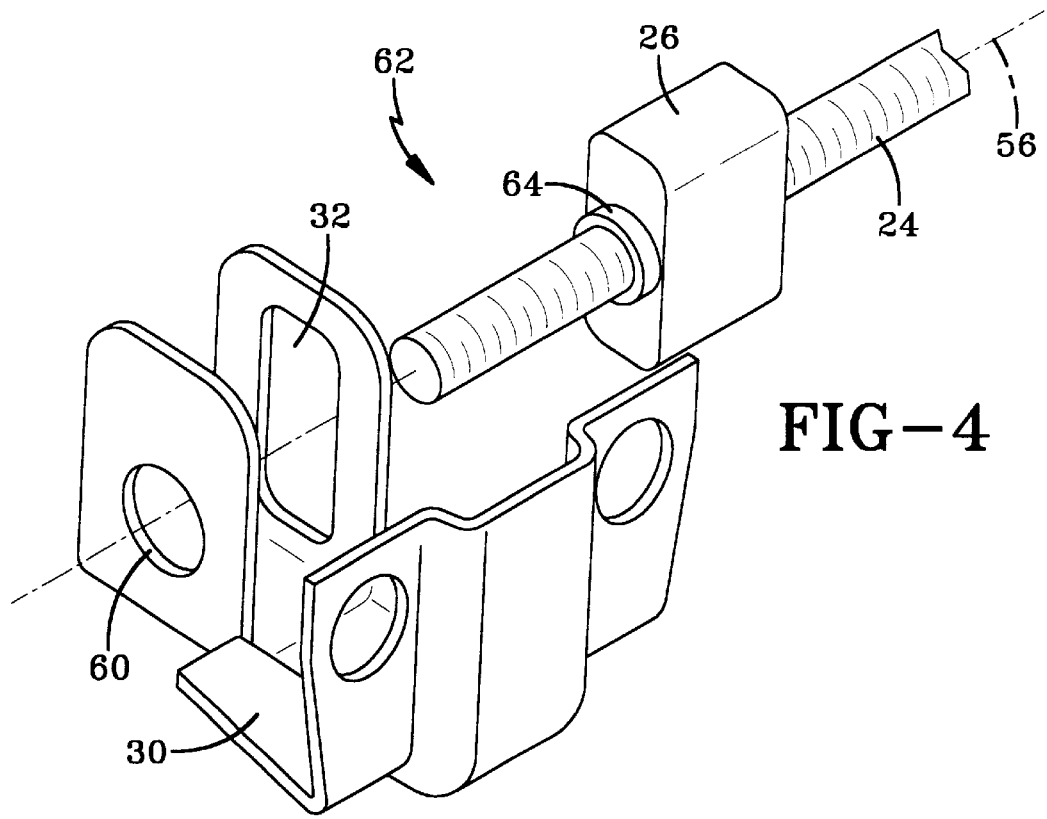
FIG. 4 is an exploded view of an alternate embodiment of the invention.

An alternative embodiment drive assembly 62 is shown in FIG. 4. The drive assembly 62 is similar to the drive assembly 22 shown in FIGS. 2 and 3 and includes a shaft 24, a bracket 30, and a drive nut 26. The shaft 24 supports at least one bushing 64 that provides a bearing surface between the bracket 30 and the shaft 24 as the shaft rotates within the openings 32 and/or 60 when the drive motor 28 drives the shaft 24. The bushing 64 can be made of any known bushing material or type known in the art.

Figure 5:
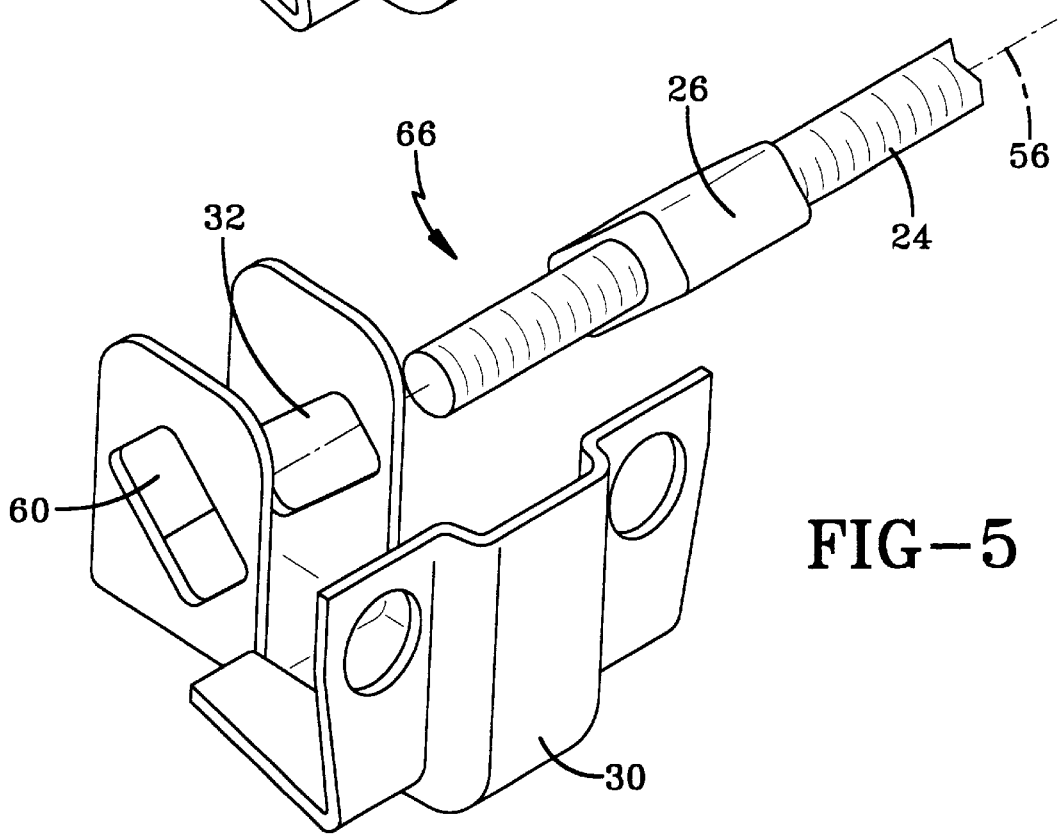
FIG. 5 is an exploded view of an alternate embodiment of the invention.

As discussed above, the opening 60 in the bracket 30 can be of any shape. In the embodiment shown in FIGS. 2 and 3 the opening 32 in the first leg 46 of the bracket 30 is rectangular in shape and the opening 60 in the second leg 48 is circular in shape. An alternative embodiment drive assembly 66 is shown in FIG. 5. The drive assembly 66 is similar to the drive assembly 22 of FIGS. 2 and 3 and includes a shaft 24, a bracket 30, and a drive nut 26. In this embodiment, both openings 32, 60 are rectangular in shape. One advantage of this embodiment is that the body portion 42 of the drive nut 26 can be inserted into the bracket 30 from either direction, i.e., the drive nut 26 can be inserted through either opening 32 or 60. Additionally, as shown in FIG. 5, the rectangular openings 32, 60 can be orientated such that the height dimensions are not vertical but instead on an angle. The openings 32, 60 can be orientated at the same angular positions or can be orientated at different angular positions.

Figure 6:
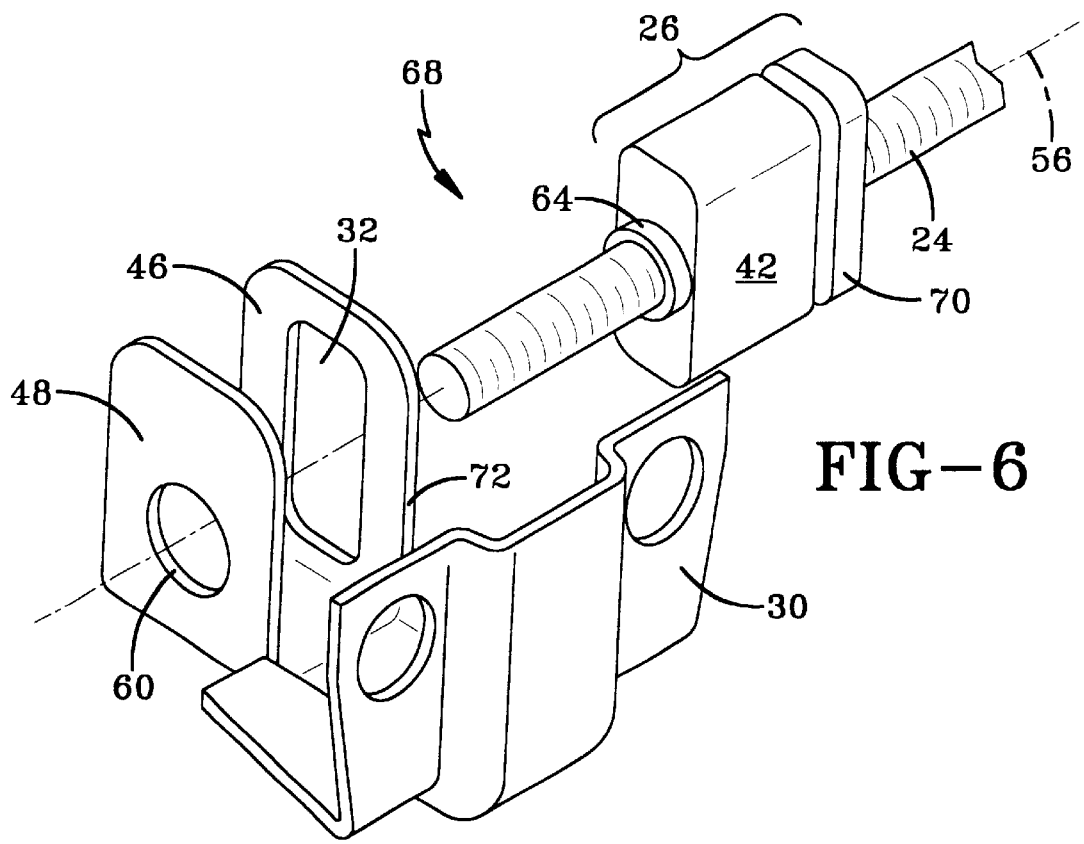
FIG. 6 is an exploded view of an alternate embodiment of the invention.

An alternative embodiment drive assembly 68 is shown in FIG. 6. The drive assembly 68 is similar to the drive assembly 22 of FIGS. 2 and 3 and includes a shaft 24, a bracket 30, and a drive nut 26. In this embodiment, the drive nut 26 is comprised of the main body portion 42 and a secondary body portion 70. The main body portion 42 is installed between the legs 46, 48 of the bracket 30, and the secondary body portion 70 is located adjacent to an external face 72 of the bracket 30. The secondary body portion 70 preferably fits up against the external face 72 of bracket leg 46 and helps locate the drive nut 26 within the bracket 30. The shaft 24 can also optionally support bushing 64 to provide a bearing surface for the shaft 24 as it rotates with respect to the bracket 30.

Figure 7:
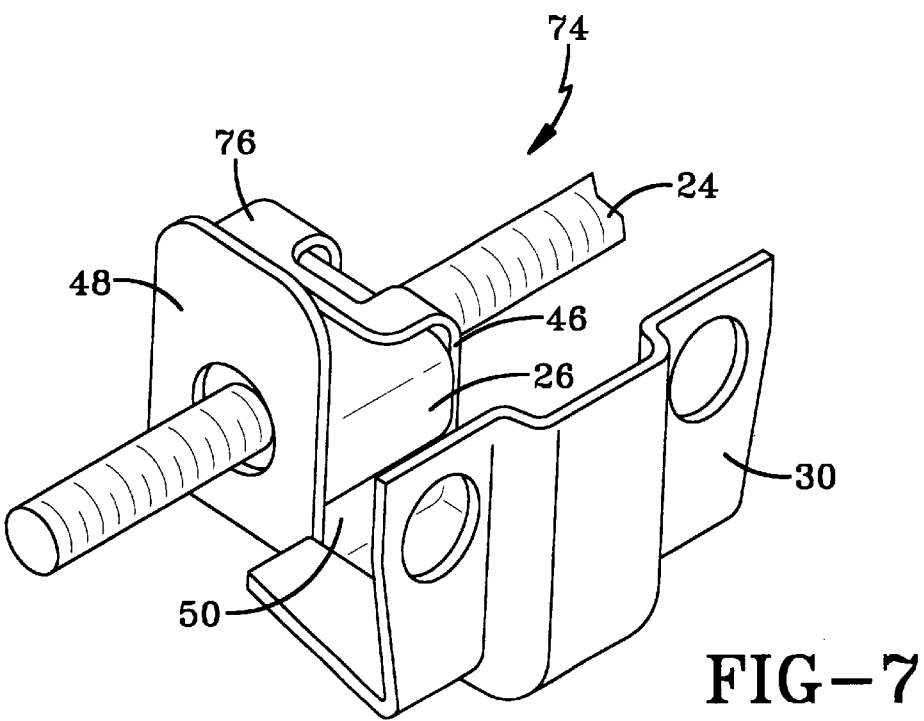
FIG. 7 is an exploded view of an alternate embodiment of the invention.

Another alternative embodiment drive assembly 74 is shown in FIG. 7. The drive assembly 74 is similar to the drive assembly 22 of FIGS. 2 and 3 and includes a shaft 24, a bracket 30, and a drive nut 26. A top portion 76 of either the first 46 or second 48 leg is bent about the drive nut 26 such that the top portion 76 is generally parallel to the base 50 after the drive nut 26 is moved to the assembled position. The bracket 30 is bent over the drive nut 26 to securely hold the nut 26 within the bracket 30.

Figure 8:
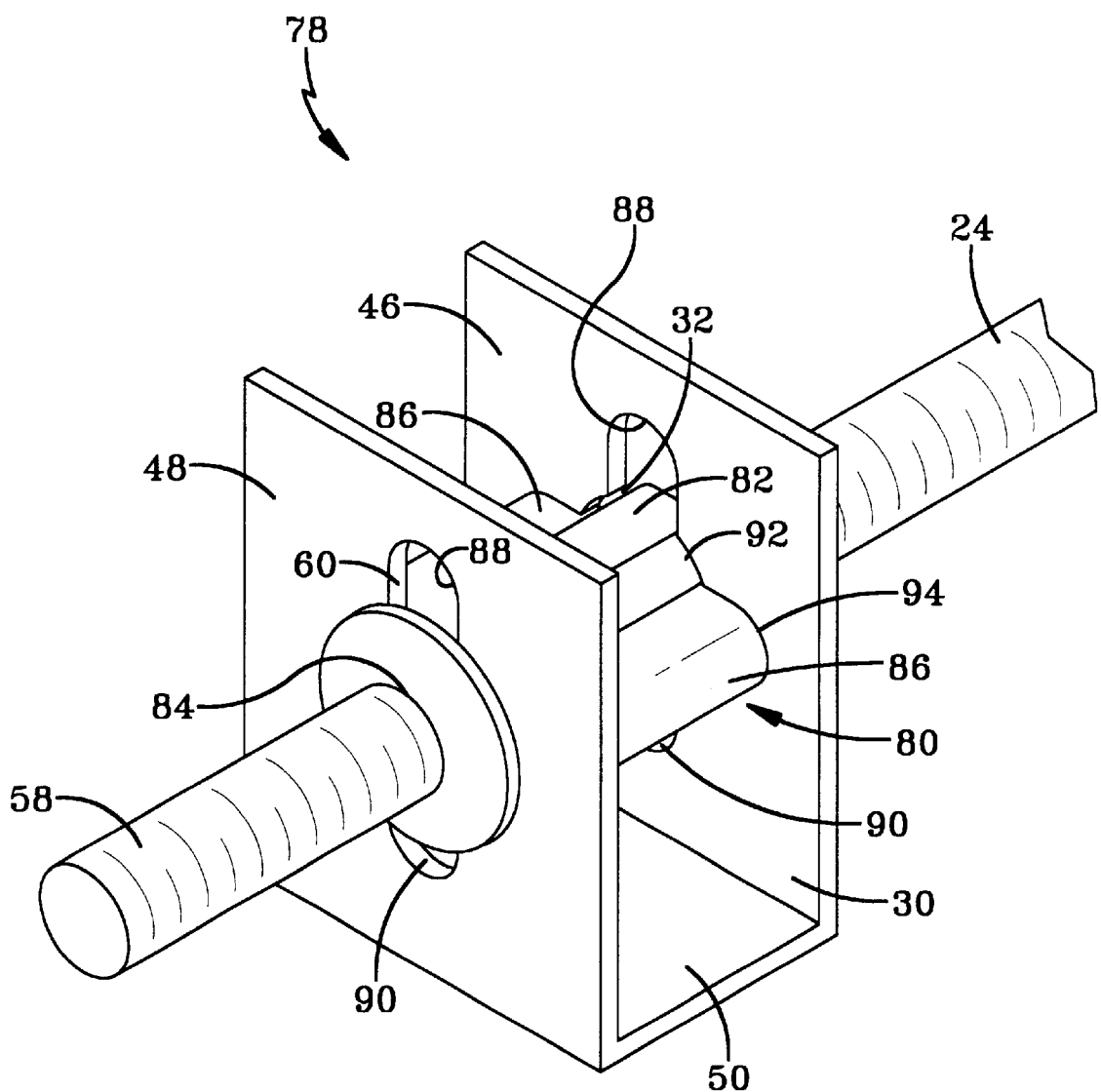
FIG. 8 is an exploded view of an alternate embodiment of the invention.

Another alternative embodiment drive assembly 78 is shown in FIG. 8. The drive assembly 78 includes a nut 80 having a body 82 that is oval in shape with a circular bore 84 extending therethrough. Rounded portions 86 located on opposing sides of the bore 84 define a height that is greater than the diameter of the bore 84. The openings 32, 60 in the bracket 30 are comprised of upper 88 and lower 90 slot portions that are interconnected by a rounded opening portion 92. The rounded portions 86 are aligned with an inserted through the upper 88 and lower 90 slot portions when the nut 80 is in the installation position. When the nut 80 is rotated to the assembled position, the rounded portions 86 engage internal faces 94 of the bracket 30 to form a positive structural engagement between the bracket 30 and nut 80. The shaft 24 extends through the bore 84 and is driven by the motor 28 with respect to the nut 80. The body 82 of the nut 80 is positioned within the rounded opening portion 92 of openings 32, 60.

The method for assembling the driving apparatus 22 in the seat adjuster and track assembly 22 includes the following steps: (a) providing the first track 14 mounted to the vehicle structure 16 or fixture and the second track 20 supported for movement relative to the first track 14, (b) fixing the bracket 30 with at least one opening 32 relative to the first track 14; (c) inserting the drive nut 26 through the opening 32 in the bracket 30; (d) rotating the drive nut 26 with respect to the bracket 30 so that the drive nut 26 cannot be removed through the opening 32; and (e) connecting the drive nut 26 to a driving mechanism. Preferably step (e) is performed before step (c).

Additional steps include providing the driving mechanism with a drive motor 28 and a screw shaft 24 that defines a screw shaft axis 56, threadably engaging the screw shaft 24 with the drive nut 26 prior to step (c), and operably connecting the screw shaft 24 to the drive motor 28 during step (e) such that the second track 20 can be moved between a plurality of adjusted positions relative to the first track 14.

Preferably step (d) is further defined to include rotating the drive nut 26 ninety degrees about the screw shaft axis 56. Another optional step includes bending the bracket 30 about the drive nut 26 after step (d).

Using the inventive drive apparatus 22 where the drive nut 26 is rotated with respect to the bracket 30 during assembly to form a positive structural engagement between the bracket 30 and nut 26 and eliminates mounting brackets and other fastening components and provides for a more compact seat adjuster and track assembly 10. This configuration also reduces cost and increase available packaging space for other seat components.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A dive assembly for a seat adjuster, comprising, in combination:
 a first member mounted to a vehicle structure and defining a longitudinal axis;
 a second member supported for movement relative to said first member along said longitudinal axis;
 a bracket fixed relative to said first member and having at least one opening;
 a shaft rotatable about an axis of rotation to move said second member relative to said first member;
 an engagement member attached to the shaft and rotatable about the axis of rotation between a first position where the engagement member moves relative to said bracket through said opening and a second position where said engagement member is fixed relative to said bracket; and
 a drive motor for diving said shaft relative to said engagement member only when said engagement member is moved from said first position to said second position.

2. An assembly as recited in claim 1, wherein said at least one opening is defined by a first vertical height and a first horizontal width and said engagement member is defined by a second vertical height and a second horizontal width, said first and second vertical heights being parallel with each other when said engagement member is in said first position and in a non-parallel relationship to each other when said engagement member is in said second position.

3. An assembly as recited in claim 1 wherein said bracket is mounted to said first member and includes first and second upwardly extending legs spaced apart from each other and interconnected by a base, said engagement member being located between said first and second legs when said engagement member is in said second position.

4. An assembly as recited in claim 3 wherein said at least one opening is comprised of a first opening in said first leg and a second opening in said second leg such that said shaft extends through said first and second openings when said engagement member is in either said first or second position.

5. An assembly as recited in claim 4 including at least one bushing mounted on said shaft to provide a bearing surface between said bracket and said shaft as said shaft rotates within said openings when said drive motor drives said shaft.

6. An assembly as recited in claim 1 wherein said engagement member is comprised of a rectangular shaped body having a central threaded bore and said shaft is comprised of an elongated cylindrical body defining an axis of rotation and having an external threaded surface that engages said threaded bore.

7. An assembly as recited in claim 6 wherein said at least one opening in said bracket is rectangular in shape and wherein said rectangular shaped body of said engagement member is aligned with said rectangular opening when said engagement member is in said first position and said rectangular shaped body is rotated ninety degrees about said axis of rotation when said engagement member is moved from said first position to said second position.

8. An assembly as recited in claim 1 wherein an external face of said engagement member comes into contact with a portion of said bracket adjacent to said at least one opening to form a positive structural engagement between said engagement member and said bracket.

9. A drive assembly for a seat adjuster, comprising, in combination:
   a first track mounted to a vehicle structure and defining a longitudinal axis;
   a second track supported for movement relative to said first track along said longitudinal axis;
   a bracket fixed relative to said first track and having at least one opening;
   a drive nut having a threaded central bore and being rotatable between a first position where said drive nut moves relative to said bracket through said opening in said bracket and a second position where said drive nut contacts said bracket to form a positive to form a positive structural engagement between said drive nut and said bracket;
   a screw shaft having an external treaded surface for engaging said treaded bore to move said second track between a plurality of adjusted positions relative to said first track; and
   a drive motor for driving said screw shaft relative to said drive nut only when said drive nut is moved from said first position to said second position;
   wherein said drive nut has a rectangular shaped body with said central bore extending therethrough and said screw shaft has an elongated cylindrical body that extends through said central bore in said rectangular shaped body and through said at least one opening when said drive nut is in either said first of second position.

10. An assembly as recited in claim 9 wherein said bracket is mounted to said first track and includes first and second upwardly extending legs spaced apart from each other and interconnected by a base, said drive nut being located between said first and second legs when said drive nut is in said second position.

11. An assembly as recited in claim 10 wherein said at least one opening is comprised of a first opening in said first leg and a second opening in said second leg and wherein said first opening is defined by a first vertical height and a first horizontal width and said drive nut is defined by a second vertical height and a second horizontal width, said first and second vertical heights being parallel with each other when said drive nut is in said first position and being non-parallel with each other when said drive nut is in said second position.

12. An assembly as recited in claim 11 wherein said first opening is rectangular in shape and said second opening is circular in shape.

13. An assembly as recited in claim 11 wherein said first and second openings are rectangular in shape.

14. An assembly as recited in claim 10 wherein a top portion of either said first or second legs is bent about said drive nut such that said top portion is generally parallel to said base after said drive nut is moved to said second position.

15. A method for assembling a drive apparatus for a seat adjuster comprising, in combination, the step of:
   (a) providing a first track mounted to a vehicle structure to define a longitudinal axis and a second track supported foe movement relative to the first track along the longitudinal axis;
   (b) fixing a bracket having a first opening and a second opening relative to the first track, wherein said first opening is rectangular in shape and said second opening is circular in shape;
   (c) inserting a drive nut through the first opening in the bracket;
   (d) rotating the drive nut with respect to the bracket so that the drive nut cannot be removed through the first opening; and
   (e) connecting the drive nut to a driving mechanism.

16. A method as recited in claim 15 wherein step (e) is performed before step (c).

17. A method as recited in claim 15 including the steps of providing the driving mechanism with a drive motor and a screw shaft that defines a screw shaft axis, threadably engaging the screw shaft with the drive nut prior to step (c), and operably connecting the screw shaft to the drive motor during step (e) such that the second track can be moved between a plurality of adjusted positions relative to the first track.

18. A method as recited in claim 17 wherein step (d) further includes rotating the drive nut ninety degrees about the screw shaft axis.

19. An assembly as recited in claim 15 further including the step of bending the bracket about the drive nut after step (d).

* * * * *